(12) United States Patent
Bunker et al.

(10) Patent No.: US 11,900,305 B2
(45) Date of Patent: Feb. 13, 2024

(54) OCCUPANCY IDENTIFICATION FOR GUIDING DELIVERY PERSONNEL

(71) Applicant: Vivint, Inc., Provo, UT (US)

(72) Inventors: Brandon Bunker, Highland, UT (US); Rongbin Lanny Lin, Draper, UT (US); Jefferson Huhta Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 412 days.

(21) Appl. No.: 17/039,139

(22) Filed: Sep. 30, 2020

(65) Prior Publication Data
US 2021/0012276 A1   Jan. 14, 2021

Related U.S. Application Data

(63) Continuation-in-part of application No. 15/885,422, filed on Jan. 31, 2018, now Pat. No. 11,049,343, (Continued)

(51) Int. Cl.
*G06Q 10/0832* (2023.01)
*G06Q 30/018* (2023.01)
(Continued)

(52) U.S. Cl.
CPC ......... *G06Q 10/0832* (2013.01); *G05B 15/02* (2013.01); *G06F 16/9035* (2019.01);
(Continued)

(58) Field of Classification Search
CPC ........... G06Q 10/0832; G06Q 10/0838; G06Q 30/0185; G06F 16/9035; G06V 40/10; G05B 15/02
See application file for complete search history.

(56) References Cited

U.S. PATENT DOCUMENTS

| 4,661,804 A | 4/1987 | Abel |
| 5,865,368 A | 2/1999 | Taylor et al. |

(Continued)

FOREIGN PATENT DOCUMENTS

| JP | 2011077835 A | 4/2011 |
| KR | 1020010016412 A | 3/2001 |

(Continued)

OTHER PUBLICATIONS

McKinnon, Alan C., and Tallam, Deepak, "Unattended delivery to the home: an assessment of the security implications," International Journal of Retail & Distribution Management, 31, 1, 2003, pp. 30-41.*

(Continued)

*Primary Examiner* — Nathan Erb
(74) *Attorney, Agent, or Firm* — Foley & Lardner LLP

(57) ABSTRACT

Methods, systems, and apparatuses for occupancy identification for guiding delivery personnel are described. One method for a security or home automation system may include receiving an indication regarding a delivery of a package to a structure associated with the security or home automation system, determining an occupancy of the structure based on the received indication, identifying an identity of an occupant within the structure based on the determined occupancy, and transmitting delivery instructions, to a delivery person associated with the delivery of the package, regarding how to deliver the package based on the identity of the occupant or the determined occupancy.

20 Claims, 11 Drawing Sheets

Related U.S. Application Data which is a continuation-in-part of application No. 14/264,728, filed on Apr. 29, 2014, now Pat. No. 10,657,483.

(51) Int. Cl.
| | | |
|---|---|---|
| G05B 15/02 | (2006.01) | |
| G06F 16/9035 | (2019.01) | |
| G06Q 10/083 | (2023.01) | |
| G06V 40/10 | (2022.01) | |

(52) U.S. Cl.
CPC ..... *G06Q 10/0838* (2013.01); *G06Q 30/0185* (2013.01); *G06V 40/10* (2022.01)

(56) References Cited

U.S. PATENT DOCUMENTS

| | | | |
|---|---|---|---|
| 6,138,910 | A | 10/2000 | Madruga |
| 6,323,782 | B1 | 11/2001 | Stephens et al. |
| 6,476,858 | B1 | 11/2002 | Ramirez et al. |
| 6,570,488 | B2 | 5/2003 | Kucharczyk et al. |
| 6,696,918 | B2 | 2/2004 | Kucharczyk et al. |
| 6,725,127 | B2 | 4/2004 | Stevens |
| 6,862,576 | B1 | 3/2005 | Turner et al. |
| 6,879,836 | B2 | 4/2005 | Nakamoto et al. |
| 7,158,941 | B1 | 1/2007 | Thompson et al. |
| 7,221,928 | B2 * | 5/2007 | Laird ............ A61B 5/411 340/539.18 |
| 7,518,485 | B2 | 4/2009 | Shuster |
| 7,653,603 | B1 | 1/2010 | Holtkamp, Jr. et al. |
| RE43,178 | E | 2/2012 | Ghazarian |
| 8,200,516 | B2 * | 6/2012 | Tomioka ............ G06Q 10/08 705/7.11 |
| 8,261,976 | B1 | 9/2012 | Block et al. |
| 8,493,193 | B2 | 7/2013 | Louis et al. |
| 9,161,164 | B2 | 10/2015 | Proctor et al. |
| 9,418,495 | B2 | 8/2016 | Mackin et al. |
| 9,437,063 | B2 | 9/2016 | Schoenfelder et al. |
| 9,449,317 | B2 | 9/2016 | Reblin |
| 9,536,359 | B1 | 1/2017 | Gokcebay |
| 9,626,857 | B2 | 4/2017 | Fokkelman |
| 9,704,361 | B1 * | 7/2017 | Hazlewood ............ G05B 15/02 |
| 9,721,147 | B1 | 8/2017 | Kapczynski |
| 2001/0045180 | A1 | 11/2001 | McCormick et al. |
| 2001/0050615 | A1 | 12/2001 | Kucharczyk et al. |
| 2001/0051877 | A1 | 12/2001 | Steval |
| 2002/0027981 | A1 | 3/2002 | Bedrosian et al. |
| 2002/0035515 | A1 | 3/2002 | Moreno |
| 2002/0067261 | A1 | 6/2002 | Kucharczyk et al. |
| 2002/0087375 | A1 | 7/2002 | Griffin et al. |
| 2002/0087429 | A1 | 7/2002 | Shuster et al. |
| 2002/0112174 | A1 | 8/2002 | Yager et al. |
| 2002/0113703 | A1 | 8/2002 | Moskowitz et al. |
| 2002/0138759 | A1 | 9/2002 | Dutta et al. |
| 2002/0147919 | A1 | 10/2002 | Gentry et al. |
| 2002/0156645 | A1 | 10/2002 | Hansen et al. |
| 2002/0178074 | A1 | 11/2002 | Bloom et al. |
| 2002/0180582 | A1 | 12/2002 | Nielsen |
| 2003/0004889 | A1 | 1/2003 | Fiala et al. |
| 2003/0006275 | A1 | 1/2003 | Gray et al. |
| 2003/0022676 | A1 | 1/2003 | Nakamoto et al. |
| 2003/0023870 | A1 | 1/2003 | Geros et al. |
| 2003/0037009 | A1 | 2/2003 | Tobin et al. |
| 2003/0050732 | A1 | 3/2003 | Rivalto |
| 2003/0135432 | A1 | 7/2003 | McIntyre et al. |
| 2003/0195814 | A1 | 10/2003 | Striemer et al. |
| 2004/0149823 | A1 | 8/2004 | Aptekar et al. |
| 2004/0172403 | A1 | 9/2004 | Steele et al. |
| 2004/0185842 | A1 | 9/2004 | Spaur et al. |
| 2004/0243430 | A1 | 12/2004 | Horstemeyer et al. |
| 2004/0252017 | A1 | 12/2004 | Holding et al. |
| 2005/0061877 | A1 | 3/2005 | Stevens |
| 2005/0068178 | A1 | 3/2005 | Lee et al. |
| 2005/0088281 | A1 | 4/2005 | Rohrberg et al. |
| 2005/0131774 | A1 | 6/2005 | Huxter |
| 2005/0187836 | A1 | 8/2005 | Wolfe |
| 2006/0108419 | A1 | 5/2006 | Som |
| 2006/0122852 | A1 | 6/2006 | Moudy |
| 2007/0005452 | A1 | 1/2007 | Klingenberg et al. |
| 2007/0024421 | A1 | 2/2007 | Hale |
| 2007/0052586 | A1 | 3/2007 | Horstemeyer et al. |
| 2007/0138270 | A1 | 6/2007 | Reblin et al. |
| 2007/0150375 | A1 | 6/2007 | Yang et al. |
| 2007/0193834 | A1 | 8/2007 | Pai et al. |
| 2007/0285227 | A1 | 12/2007 | Timothy et al. |
| 2008/0121682 | A1 | 5/2008 | Grim et al. |
| 2008/0252723 | A1 | 10/2008 | Park |
| 2009/0179735 | A1 | 7/2009 | Van Rysselberghe et al. |
| 2009/0298491 | A1 | 12/2009 | Kadaba et al. |
| 2010/0059587 | A1 | 3/2010 | Miller et al. |
| 2010/0076903 | A1 * | 3/2010 | Klingenberg ........ G06Q 10/083 707/E17.107 |
| 2010/0241564 | A1 | 9/2010 | Miller et al. |
| 2010/0303307 | A1 | 12/2010 | Rothschild |
| 2010/0332402 | A1 * | 12/2010 | Kantarjiev ........... G06Q 30/016 701/532 |
| 2011/0130134 | A1 | 6/2011 | Rysselberghe et al. |
| 2011/0238574 | A1 | 9/2011 | Miller et al. |
| 2011/0276510 | A1 | 11/2011 | Turbeville et al. |
| 2011/0316683 | A1 | 12/2011 | Louis et al. |
| 2012/0030124 | A1 | 2/2012 | Cronkright et al. |
| 2012/0030133 | A1 | 2/2012 | Rademaker et al. |
| 2012/0044050 | A1 | 2/2012 | Vig et al. |
| 2012/0169453 | A1 | 7/2012 | Bryla et al. |
| 2012/0223133 | A1 | 9/2012 | Miller et al. |
| 2012/0226622 | A1 | 9/2012 | Gonzalez et al. |
| 2012/0233085 | A1 | 9/2012 | Zimberoff et al. |
| 2012/0249328 | A1 | 10/2012 | Xiong |
| 2013/0010144 | A1 | 1/2013 | Park |
| 2013/0017812 | A1 | 1/2013 | Foster |
| 2013/0027552 | A1 | 1/2013 | Guzik |
| 2013/0261792 | A1 | 10/2013 | Gupta et al. |
| 2013/0311365 | A1 | 11/2013 | Miller et al. |
| 2014/0046842 | A1 | 2/2014 | Irudayam et al. |
| 2014/0052660 | A1 | 2/2014 | Lee et al. |
| 2014/0156472 | A1 | 6/2014 | Stuntebeck et al. |
| 2014/0195626 | A1 | 7/2014 | Ruff et al. |
| 2014/0221012 | A1 | 8/2014 | Uetabira |
| 2014/0252091 | A1 | 9/2014 | Morse et al. |
| 2014/0257691 | A1 | 9/2014 | Siris |
| 2014/0266669 | A1 | 9/2014 | Fadell et al. |
| 2014/0279596 | A1 | 9/2014 | Waris et al. |
| 2014/0279666 | A1 | 9/2014 | Lievens |
| 2014/0317005 | A1 | 10/2014 | Balwani et al. |
| 2014/0324192 | A1 | 10/2014 | Baskaran et al. |
| 2014/0334684 | A1 | 11/2014 | Strimling |
| 2014/0351125 | A1 | 11/2014 | Miller et al. |
| 2015/0058056 | A1 | 2/2015 | Comerford et al. |
| 2015/0102903 | A1 | 4/2015 | Wilkinson |
| 2015/0123766 | A1 | 5/2015 | St. John |
| 2015/0142594 | A1 | 5/2015 | Lutnick et al. |
| 2015/0143461 | A1 | 5/2015 | Uetabira |
| 2015/0186869 | A1 | 7/2015 | Winters et al. |
| 2015/0187136 | A1 | 7/2015 | Grimaud |
| 2015/0194000 | A1 | 7/2015 | Schoenfelder et al. |
| 2015/0199673 | A1 | 7/2015 | Savolainen et al. |
| 2015/0199857 | A1 | 7/2015 | Mackin et al. |
| 2015/0221151 | A1 | 8/2015 | Bacco et al. |
| 2015/0261956 | A1 | 9/2015 | Anderson et al. |
| 2015/0302495 | A1 | 10/2015 | Stuckman et al. |
| 2015/0310443 | A1 | 10/2015 | Thomasson |
| 2016/0027093 | A1 | 1/2016 | Crebier |
| 2016/0088287 | A1 | 3/2016 | Sadi et al. |
| 2016/0105644 | A1 | 4/2016 | Smith et al. |
| 2016/0142644 | A1 | 5/2016 | Lin et al. |
| 2016/0171435 | A1 | 6/2016 | Newton et al. |
| 2016/0185503 | A1 | 6/2016 | Balwani |
| 2016/0259928 | A1 | 9/2016 | Donenfeld |
| 2016/0301674 | A1 | 10/2016 | Uetabira |
| 2016/0371620 | A1 | 12/2016 | Nascenzi et al. |
| 2017/0109950 | A1 | 4/2017 | Bacco et al. |
| 2017/0149758 | A1 | 5/2017 | Uetabira |
| 2017/0213033 | A1 | 7/2017 | Anderson et al. |

(56) References Cited

U.S. PATENT DOCUMENTS

| | | | |
|---|---|---|---|
| 2017/0236101 A1 | 8/2017 | Irudayam et al. | |
| 2017/0355076 A1* | 12/2017 | Gordon-Carroll | G06Q 10/08 |
| 2017/0372321 A1 | 12/2017 | Weiss | |
| 2018/0151013 A1 | 5/2018 | Carstens et al. | |
| 2018/0158265 A1* | 6/2018 | Lyman | G07C 9/20 |
| 2018/0232976 A1 | 8/2018 | Schoenfelder et al. | |
| 2018/0322289 A1 | 11/2018 | Anderson et al. | |
| 2019/0114853 A1 | 4/2019 | Schoenfelder et al. | |

FOREIGN PATENT DOCUMENTS

| | | | | |
|---|---|---|---|---|
| KR | 1020060111749 A | | 10/2006 | |
| KR | 1020130082790 A | | 7/2013 | |
| WO | 2007098217 A2 | | 8/2007 | |
| WO | WO 2014/047501 A1 | * | 3/2014 | G08B 1/08 |

OTHER PUBLICATIONS

Shemkus, Sarah, "Pressure to deliver: For FedEx, UPS holiday challenge includes throwing off the thieves," Boston Globe, Boston u Globe Media Partners LLC, Boston, Massachusetts, B.5, Dec. 19, 2012.

Walmsley, Andrew, "Not-so-special delivery," Marketing, 12, London, Haymarket Business Publications Ltd., Jan. 12, 2011.

Extended European Search Report for EP Application No. 15786776.3, dated Aug. 9, 2017 (7 pp.).

International Search Report and Written Opinion of the International Searching Authority for PCT/US2015/026930, dated Jul. 28, 2015.

International Search Report and Written Opinion of the International Searching Authority for PCT/US2018/030240, dated Aug. 14, 2018.

Vast-Binder Jr., John Philip, Mailman: Studies of Urban Letter Carriers, Northwestern University, Evanston, Illinois, Aug. 1973.

"English machine translation of JP 2011-077835", Apr. 14, 2011.

"English machine translation of KR 10-2001-0046412", Mar. 5, 2001.

"English machine translation of KR 10-2006-0111749", Oct. 30, 2006.

"English machine translation of KR 10-2013-0082790", Sep. 22, 2013.

Guo, H. et al., "Joint Video Stitching and Stabilization from Moving Cameras", IEEE Transactions on Image Processing, vol. 25, No. 11, Nov. 2016, pp. 5491-5503.

Jiang, W. et al., "Video Stitching with Spatial-Temporal Content-Preserving Warping", Computer Vision and Pattern Recognition Workshops (CVPRW), 2015 IEEE Conference on Date of Conference: Jun. 7-12, 2015 Date Added to IEEE Xplore: Oct. 26, 2015, Electronic ISSN: 2160-7516 INSPEC Accession No. 15554203 DOI: 10.1109/CVPRW.2015.7301374.

Rieffel, E. G. et al., "Geometric Tools for Multicamera Surveillance Systems", Distributed Smart Cameras, 2007, ICDSC '07, First ACM/IEEE International Conference on Date of Conference: Sep. 25-28, 2007, FX Palo Alto Laboratory, Palo Alto, CA, Oct. 22, 2007, 8 pp.

* cited by examiner

Delivery Information 145-c

| Occupant Identity | Age | Gender | Handicap | Preference |
|---|---|---|---|---|
| John Smith | 42 | Male | No | None |
| Mary Smith | 39 | Female | No | Leave package outside |
| Joe Smith | 16 | Male | No | None |
| Alex Smith | 13 | Male | Blind | None |
| Jane Smith | 6 | Female | No | None |

FIG. 5

OCCUPANCY IDENTIFICATION FOR GUIDING DELIVERY PERSONNEL

CROSS REFERENCE TO RELATED APPLICATIONS

The present application is a continuation in part of U.S. patent application Ser. No. 15/885,422, entitled "Techniques for Securing a Dropspot," filed Jan. 31, 2018, which is a continuation in part of U.S. patent application Ser. No. 14/264,728, entitled "Systems and Methods for Secure Package Delivery," filed Apr. 29, 2014. The disclosures of each of which are incorporated by reference herein in their entirety.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer system may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of premises automation and home security products. Advancements in mobile devices allow users to monitor a home or business. Information related to secure package delivery, however, may not be readily available. As a result, benefits may be realized by providing systems and methods for secure package delivery in relation to premises automation systems.

SUMMARY

The described techniques relate to improved methods, systems, devices, or apparatuses that support secure package delivery.

A method for a security or home automation system to provide secure package delivery is described. The method may include receiving an indication regarding a delivery of a package to a structure associated with the security or home automation system, determining an occupancy of the structure based at least in part on the received indication, identifying an identity of an occupant within the structure based at least in part on the determined occupancy, and transmitting delivery instructions, to a delivery person associated with the delivery of the package, regarding how to deliver the package based at least in part on the identity of the occupant or the determined occupancy.

An apparatus for a security or home automation system to provide secure package delivery is described. The apparatus may include means for receiving an indication regarding a delivery of a package to a structure associated with the security or home automation system, means for determining an occupancy of the structure based at least in part on the received indication, means for identifying an identity of an occupant within the structure based at least in part on the determined occupancy, and means for transmitting delivery instructions, to a delivery person associated with the delivery of the package, regarding how to deliver the package based at least in part on the identity of the occupant or the determined occupancy.

Another apparatus for a security or home automation system to provide secure package delivery is described. The apparatus may include a processor, memory in electronic communication with the processor, and instructions stored in the memory. The instructions may be executable by the processor to cause the apparatus to receive an indication regarding a delivery of a package to a structure associated with the security or home automation system, determine an occupancy of the structure based at least in part on the received indication, identify an identity of an occupant within the structure based at least in part on the determined occupancy, and transmit delivery instructions, to a delivery person associated with the delivery of the package, regarding how to deliver the package based at least in part on the identity of the occupant or the determined occupancy.

A non-transitory computer-readable medium storing code for a security or home automation system to provide secure package delivery including is described. The code may include instructions executable by a processor to receive an indication regarding a delivery of a package to a structure associated with the security or home automation system, determine an occupancy of the structure based at least in part on the received indication, identify an identity of an occupant within the structure based at least in part on the determined occupancy, and transmit delivery instructions, to a delivery person associated with the delivery of the package, regarding how to deliver the package based at least in part on the identity of the occupant or the determined occupancy.

Some examples of the method, apparatus, and non-transitory computer-readable medium described herein may further include operations, features, means, or instructions for generating a message, requesting the occupant to select a delivery area associated with the structure for the delivery person to deliver the package, based at least in part on the identity. In some examples of the method, apparatus, and non-transitory computer-readable medium described herein, the transmitted instructions comprise an indication of the selected delivery area.

In some examples of the method, apparatus, and non-transitory computer-readable medium described herein, the delivery area comprises a location external to the structure or a location internal to the structure. Some examples of the method, apparatus, and non-transitory computer-readable medium described herein may further include operations, features, means, or instructions for identifying a delivery setting associated with the occupant. In some examples of the method, apparatus, and non-transitory computer-readable medium described herein, the instructions regarding how to deliver the package are further based at least in part on the delivery setting.

Some examples of the method, apparatus, and non-transitory computer-readable medium described herein for identifying the delivery setting may further include operations, features, means, or instructions for correlating the identity of the occupant to a set of delivery settings stored in a database.

Some examples of the method, apparatus, and non-transitory computer-readable medium described herein may further include operations, features, means, or instructions for inferring a delivery setting based at least in part on an age or a gender of the occupant, or both.

Some examples of the method, apparatus, and non-transitory computer-readable medium described herein for inferring the delivery setting may further include operations, features, means, or instructions for comparing the age of the occupant to an age level, determining whether the age of the occupant is below the age level, identifying the gender of the occupant, and determining a delivery area associated with the structure for the delivery person to deliver the package based at least in part whether the age of the occupant is below the age level or the gender of the occupant, or both.

Some examples of the method, apparatus, and non-transitory computer-readable medium described herein may further include operations, features, means, or instructions for selecting a location external to the structure as the delivery area based at least in part on the age of the occupant being below the age level or the gender of the occupant, or both. In some examples of the method, apparatus, and non-transitory computer-readable medium described herein, the delivery instructions comprise an indication of the selected location as the delivery area.

Some examples of the method, apparatus, and non-transitory computer-readable medium described herein may further include operations, features, means, or instructions for selecting a location internal to the structure as the delivery area based at least in part on the age of the occupant being below the age level or the gender of the occupant, or both. In some examples of the method, apparatus, and non-transitory computer-readable medium described herein, the delivery instructions comprise an indication of the selected location as the delivery area.

Some examples of the method, apparatus, and non-transitory computer-readable medium described herein for identifying the identity of the occupant may further include operations, features, means, or instructions for capturing an image of the occupant, and performing image analysis on the captured image to identify the identity of the occupant.

BRIEF DESCRIPTION OF THE DRAWINGS

FIG. 5 illustrates an example of delivery information that supports secure package delivery in accordance with aspects of the present disclosure.

DETAILED DESCRIPTION

Figure 1:
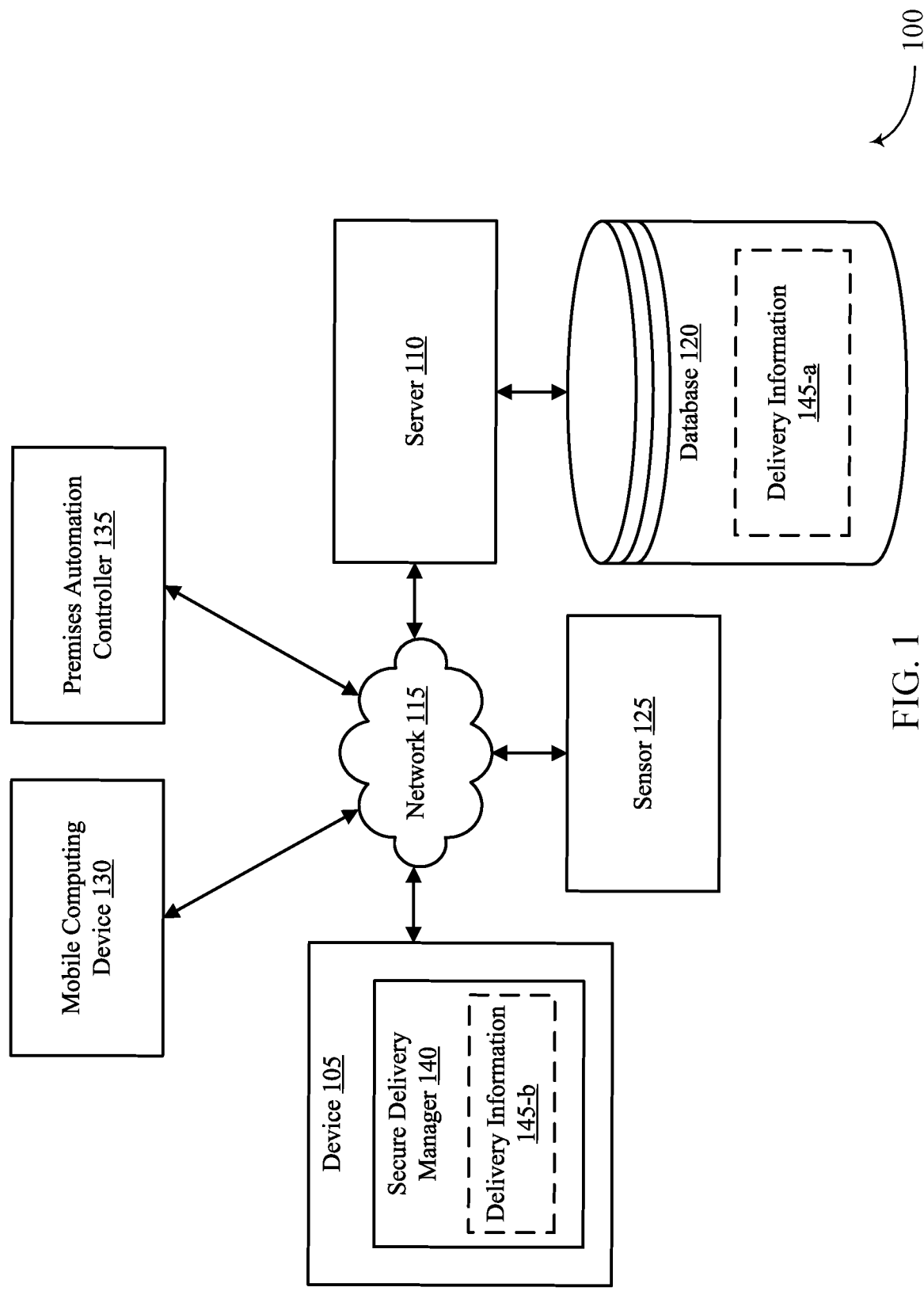
FIG. 1 illustrates an example environment that supports secure package delivery in accordance with aspects of the present disclosure.

The systems and methods described herein relate to premises automation. More specifically, the systems and methods described herein relate to secure delivery of a package to a designated delivery area within a premises. Currently, several drawbacks exist with the current delivery model. For example, the typical delivery to a home or residence includes the delivery person approaching the front door, knocking on the door and/or ringing the doorbell, waiting for an occupant to answer the door, and leaving the package near the doorstep if no one answers the door. In most cases, the delivery person simply knocks on the door and leaves the package on the door step without waiting for someone to answer the door. This delivery model leaves the package vulnerable to theft as the package may be easily visible from the street. Theft of delivered packages from door steps is a significant problem during the holiday season when the number of package deliveries increases dramatically.

Another issue with the current delivery model is that some packages require a signature in order for the delivery person to release custody of the package. In these cases, the delivery person will wait for someone to answer the door after knocking. However, if no one answers the door, the delivery person may leave a note indicating that an attempt was made to deliver the package and that the delivery person will return on a specified day to attempt again to deliver the package. If no one answers the door on the second delivery attempt, the delivery person will leave a note indicating that the recipient may pick up the package at a designated delivery location. This current structure results in additional costs and inconvenience to both delivery companies as well as the recipients of the packages.

Accordingly, the present systems and methods resolve these and other issues by enabling the secure delivery of packages to a designated delivery area within the premises. Even when no one is home or present at a business, a delivery person may be enabled to deliver a package to a designated area of a premises without granting the delivery person full access to the premises. For example, an automated system may grant the delivery person access to a garage area of a premises while ensuring all other access points to the premises area are locked and secure (e.g., ensuring the door from inside the premises to the garage area is locked, etc.). In another example, an automated system may grant the delivery person access to a lobby of a business while ensuring other access points to the business are locked and secure. In addition, the system may monitor the delivery area while the delivery person is delivering the package, capturing one or more photo and/or video images of the delivery area which may be captured and sent to one or more occupants of the premises in realtime to enable the occupant to monitor the delivery in-progress.

In those situations where an occupant is present at the premises, the system may determine the identity of the occupant. The identity of the occupant may be determined using a video camera, using speech or audio recognition, using a location of a mobile device, consulting a calendar of the potential occupants, using other identification techniques, or combinations thereof.

Upon determining the identity of the occupant, the system may determine whether the occupant has delivery preferences. For example, an occupant may have a preference that all deliveries are left on the door step when that occupant is present at the premises. In another case, the occupant's preference may include having the delivery person enter the home to leave the package. The system may determine that the occupant has such a preference by consulting with a database that associates each potential occupant's identity with that occupant's delivery preferences. In other examples, demographic information about the occupant may be stored in the database and be associated with each of the potential occupants. In some examples, the demographics of the occupant may be derived to determine assumed delivery preferences. For example, if the demographics indicate that the occupant is a child, the system may determine that the delivery preference is to leave the package outside of the structure.

FIG. 1 is a block diagram illustrating one embodiment of an environment 100 in which the present systems and methods may be implemented. In some embodiments, the systems and methods described herein may be performed on a device (e.g., device 105). The environment 100 may include a device 105, a server 110, a sensor 125, a mobile computing device 130, a premises automation controller 135, and a network 115 that allows the de-vice 105, the server 110, the mobile computing device 130, premises automation controller 135, and sensor 125 to communicate with one another.

Examples of the device 105 may include a remote actuated locking mechanism, a remote actuated garage door controller, a remote actuated gate controller, mobile computing device, smart phone, personal computing device, computer, server, etc.

Examples of the server 110 may include a server administered by a delivery company (e.g., UPS, FedEx, DHL, etc.), a server administered by a premises automation and/or security company, and the like. Accordingly, in some embodiments, environment 100 includes connections to two or more servers (e.g., a connection to a delivery company server and a connection to a premises security company, etc.). Examples of the premises automation controller 135 may include a dedicated premises automation computing device (e.g., wall-mounted controller), a personal computing device (e.g., laptop, desktop, etc.), a mobile computing device (e.g., tablet computing device, smart phone, etc.), and the like.

Examples of sensor 125 include a camera sensor, audio sensor, forced entry sensor, shock sensor, proximity sensor, boundary sensor, light beam sensor, three-dimensional (3-D) sensor, motion sensor, smoke sensor, glass break sensor, door sensor, window sensor, carbon monoxide sensor, accelerometer, global positioning system (GPS) sensor, WiFi positioning system sensor, capacitance sensor, radio frequency sensor, near-field sensor, temperature sensor, heartbeat sensor, breathing sensor, oxygen sensor, carbon dioxide sensor, brain wave sensor, movement sensor, voice sensor, and the like. Sensor 125 may represent one or more separate sensors or a combination of two or more sensors in a single device. For example, sensor 125 may represent one or more camera sensors and one or more motion sensors connected to environment 100. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105.

Additionally, or alternatively, sensor 125 may be integrated with a home appliance or fixture such as a light bulb fixture. Sensor 125 may include an accelerometer to enable sensor 125 to detect a movement. For example, sensor 125 may be attached to a set of golf clubs in a garage area. Sensor 125 may include a wireless communication device that may enable the sensor 125 to send and receive data and/or information to and from one or more devices in environment 100. Additionally, or alternatively, sensor 125 may include a GPS sensor to enable sensor 125 to track a location of sensor 125 attached to an asset. Sensor 125 may include a proximity sensor to enable sensor to detect a proximity of a person relative to an object to which the sensor is attached and/or associated. In some embodiments, sensor 125 may include a forced entry sensor (e.g., shock sensor, glass break sensor, etc.) to enable sensor 125 to detect an attempt to enter an area by force. Sensor 125 may include a siren to emit one or more frequencies of sound (e.g., an alarm).

In some configurations, the device 105 may include a secure delivery manager 140. Although the components of the device 105 are depicted as being internal to the device 105, it is understood that one or more of the components may be external to the device 105 and connect to device 105 through wired and/or wireless connections. In some embodiments, an application may be installed on mobile computing device 130, the application enabling a user to interface with a function of device 105, secure delivery manager 140, premises automation controller 135, and/or server 110.

In some embodiments, device 105 may communicate with server 110 via network 115. Examples of a network 115 include cloud networks, local area networks (LAN), wide area networks (WAN), virtual private networks (VPN), wireless networks (using 802.11, for example), cellular networks (using 3G and/or LTE, for example), etc. In some configurations, the network 115 may include the internet. It is noted that in some embodiments, the device 105 may not include a secure delivery manager 140. For example, device 105 may include logic and/or executable instructions that enables device 105 to interface with premises automation controller 135, mobile computing device 130, and/or server 110. In some embodiments, device 105, mobile computing device 130, premises automation controller 135, and server 110 may include a secure delivery manager 140 where at least a portion of the functions of secure delivery manager 140 are performed separately and/or concurrently on device 105, mobile computing device 130, premises automation controller 135, and/or server 110. Likewise, in some embodiments, a user may access the functions of device 105 and/or premises automation controller 135 (directly or through device 105 via secure delivery manager 140) from mobile computing device 130. For example, in some embodiments, mobile computing device 130 includes a mobile application that interfaces with one or more functions of device 105, premises automation controller 135, secure delivery manager 140, and/or server 110.

In some embodiments, server 110 may be coupled to database 120. Database 120 may optionally include delivery information 145-a. For example, device 105 may access the delivery information 145-a in database 120 over network 115 via server 110. Database 120 may be internal or external to the server 110. In one example, device 105 may be coupled directly to database 120, database 120 being internal or external to device 105.

Secure delivery manager 140 additionally, or alternatively include delivery information 145-b, which may be one example of the delivery information 145-a. The secure delivery manager 140 may allow a user to control (either directly or via premises automation controller 135), from a subscription-content media set top box, an aspect of the home of the user, including security, locking or unlocking a door, checking the status of a door, locating a person or item, controlling lighting, thermostat, cameras, and the like. Further details regarding the secure delivery manager 140 are discussed below.

Figure 2:
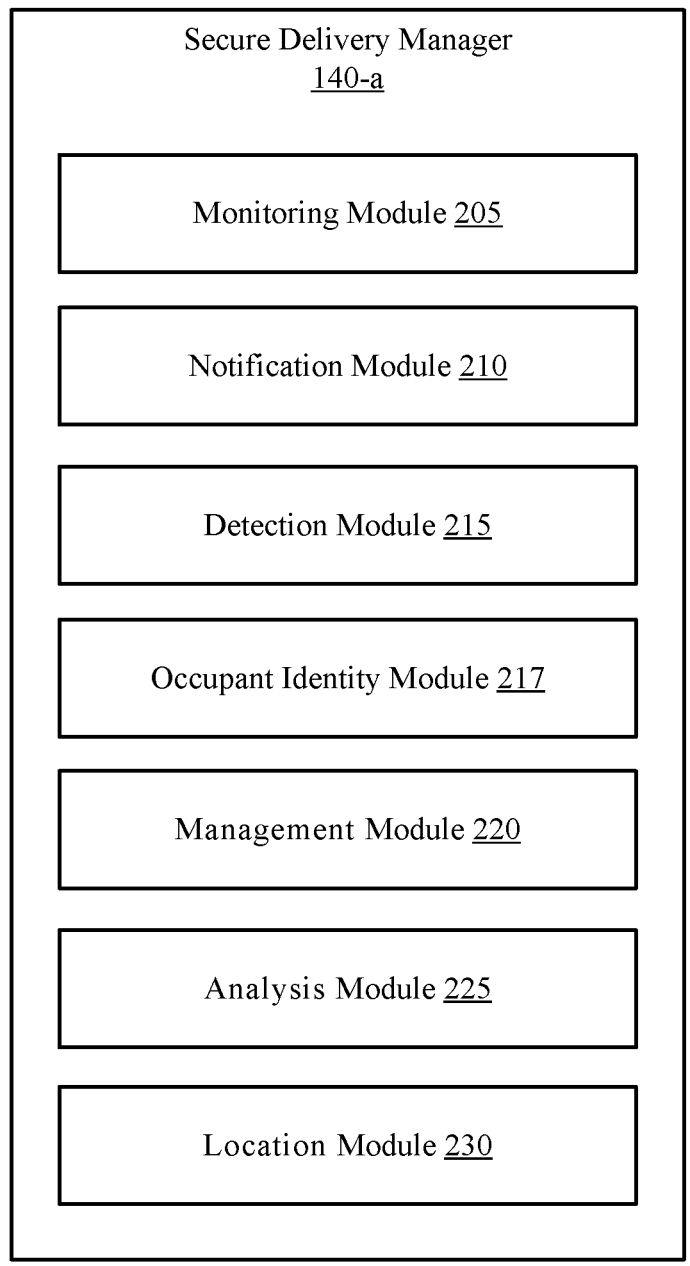
FIGS. 2 through 4 illustrate block diagrams that support secure package delivery in accordance with aspects of the present disclosure.

FIG. 2 illustrates a block diagram 200 that support secure package delivery in accordance with aspects of the present disclosure. The secure delivery manager 140-a may be one example of secure delivery manager 140 depicted in FIG. 1. As depicted, secure delivery manager 140-a may include monitoring module 205, notification module 210, a detection module 215, a management module 220, an analysis module 225, and a location module 230.

In one embodiment, monitoring module 205 may receive information regarding a delivery of a package to a premises such as home or business. The information received may include a delivery company name, delivery person information (e.g., delivery person name, photo ID, work ID, etc.), a unique code associated with the company (e.g., barcode, QR code, etc.), a unique code associated with the delivery person, scheduled date of delivery, an expected time of delivery (e.g., a window of time), tracking number, number of packages, weight of each package, dimensions of each package, etc. In some cases, monitoring module 205 may be granted access to a user account associated with a delivery company. Thus, in some cases, monitoring module 205 may query delivery information by accessing the user account, from which monitoring module 205 may receive notices of expected deliveries, real-time updates to the delivery information, real-time notices of a delivery person's arrival at the premises, etc. In some cases, notification module 210 may generate one or more notifications based on the received information regarding a delivery of a package to the premises.

In one example, detection module 215 may detect a delivery person arriving at the premises. In some cases, monitoring module 205 may determine a location of a delivery vehicle. The location of the delivery vehicle may be determined by a location device on the delivery vehicle such as a global positioning system (GPS), the delivery person providing information regarding his or her location (e.g., present delivery location, next delivery location, etc.), and the like. Accordingly, monitoring module 205 may receive information indicating that the delivery vehicle is at and/or within a predefined distance of the premises. Detection module 215 may be configured to recognize a delivery vehicle, a delivery uniform, a delivery company logo, etc. Thus, in some cases, upon receiving information indicating the delivery vehicle is at or near the premises, detection module 215 may scan captured images to detect a delivery vehicle and/or delivery person.

In some cases, the delivery person may ring a doorbell and/or knock on the door of the premises and/or trigger a motion detector. Upon detecting the delivery person at the door, a camera may capture a photo and/or video image of delivery person. The detection module 215 may compare a captured image to an image of the delivery person provided by the delivery company (e.g., a photo ID of the delivery person provided in the information received by the monitoring module 205). In some cases, an automated system (e.g., a prerecorded message, a voice simulated message, etc.) may request that the delivery person stare into the camera in order to capture an image with a similar viewpoint as that of an image of the delivery person provided by the delivery company. Additionally, or alternatively, a delivery person may be instructed to place an identification card in relation to the camera. The identification card may include a photo ID of the delivery person, a delivery person name, a company name, a company logo, a unique code (e.g., barcode, QR code, etc.), short-range communication capabilities (e.g., radio frequency ID (RFID), near-field communication (NFC), etc.), and the like. Upon receiving data from and/or capturing an image of the identification card, the detection module 215 may use any combination of the captured information (e.g., photo ID, name, barcode, RFID, etc.) to verify the identity of the delivery person. In some cases, such as when the delivery person arrives outside an expected period of time, additional verification may be requested.

In some embodiments, before granting the delivery person access to a secure delivery area, the detection module 215 may request the delivery company verify the location of the delivery person. For example, secure delivery manager 140-a may query a server of the delivery company (e.g., server 110) to determine the current location of the delivery vehicle associated with the expected delivery. Additionally, or alternatively, before granting the delivery person access to a secure delivery area, the detection module 215 may request that the occupant approve granting the delivery person access to the secure delivery location. For example, the occupant may receive a real-time notification regarding the arrival of the delivery person to the premises. Thus, the occupant may receive a live audio and/or photo and/or video image feed of the delivery in progress. In some cases, the occupant may be enabled to communicate with the delivery person in real-time (e.g., between the occupant's mobile computing device and an intercom at the premises over a data network). In some embodiments, the detection module 215 may request that the delivery person enter information associated with the package such as a tracking number and/or an employee identification code. In some cases, the detection module 215 may determine that the information is sent and/or received by a computing machine owned by the delivery company. For example, the system may determine that the information entered by the delivery person is verified and registered by a secure server owned by the delivery company. Upon verifying that the information is entered and verified by the delivery company, temporary access to the secure delivery area may be granted.

In some examples, the occupant identity module 217 may identity the occupants at the premise, which may affect the delivery instructions provided by the management module 220. The occupant identify module 217 may include a camera, a microphone, other types of sensors, or combinations thereof to determine the identity of the occupant. In some cases, the occupant identity module 217 may access a calendar of each of the potential occupants or use a global positioning system associated with a mobile device of the potential occupants to determine the identity of the occupants in the structure.

In some embodiments, management module 220 may manage the secure delivery of the package once the arrival of an expected delivery is verified (e.g., verifying delivery information, identity of delivery person, etc.). In some cases, management module 220 may provide instructions to the delivery person regarding where to place the delivery at the premises based in at least in part of the identity of the occupant. In some cases, the delivery instructions may vary depending on the occupant who is present or expected to be present at the time that the delivery person arrives at the premises. In some cases, the instructions may be provided to the delivery person upon detecting the delivery person arriving at the premises. For example, the delivery person may knock on the door or ring the doorbell of the premises. Upon detecting the delivery person at the door, a communication device (e.g., a speaker at the door that is part of an intercom system of the premises) may provide instructions to the delivery person. The instructions may include prerecorded messages, digital text-to-speech messages, and the like. For example, management module 220 play a recorded message from an intercom at the premises, the recorded message including instructions how and where to deliver the package (e.g., how to get a garage door to open, how to get a front door to unlock, where to place inside the garage of the premises, where to place inside the front door, etc.). In some embodiments, management module 220 may provide instructions to the delivery person via a data communication. For example, the delivery person may receive an email, a text message, a radio message (e.g., from a dispatch, etc.), and the like. In some cases, the delivery person may be notified that the process of placing the delivery at the designated delivery location will be recorded.

In some embodiments, the management module 220 may send a temporary access code to a device associated with the delivery person. For example, upon detecting the arrival and/or verifying the identity of the delivery person, the management module 220 may send a temporary access code to a device of the delivery person (e.g., smart phone, tablet computing device, BLUETOOTH® device, etc.). The temporary access code may include a temporary electronic key configured to unlock the front door, a temporary frequency code configured to open the garage door wirelessly, or a temporary keypad code configured to open the garage door via a keypad outside the garage door. The temporary access code may be configured to operate only during a predetermined time period (e.g., based on an expected time of delivery received by the monitoring module 205, etc.), upon detecting the arrival of the delivery person, and/or upon authenticating the identity of the delivery person.

In one embodiment, management module 220 may request an occupant of the premises to select a delivery area and to specify a location within the delivery area where the package is to be placed by the delivery person. The occupant may designate the delivery area by selecting an option presented on a control panel, selecting a location via a smart phone (e.g., mobile computing device 130), speaking a voice command received and interpreted by premises automation controller 135, and the like. In some cases, the occupant may specify the location within the delivery area where the package is to be placed by the delivery person by placing a marker at the specific location. For example, after selecting a garage of the premises as the delivery area, the occupant may place a sign, decal, or other type of indicator on the floor and/or wall of the garage to specify the location of where to place the delivery. Additionally, or alternatively, the occupant may direct a light emitting device (e.g., light emitting diode (LED), LASER, etc.) to shine a light on the specific location of where to place the delivery. For example, the light emitting device may shine a focused beam of light (e.g., similar to a laser pointer) on to the delivery location. The light emitting device may be configured to emit a pattern and/or symbol such as a logo and/or one or more words to indicate the specific location of where to place the delivery. For example, the light emitting device may emit an "arrow" symbol and the words "Place Delivery Here" in relation to the designated location. In some cases, the light emitting device may emit a light of a predetermined color, may flash the light, change the color of the light, etc., to attract the attention of the delivery person. In some embodiments, the light emitting device may be activated upon detecting the delivery person entering the delivery area.

In one embodiment, the management module 220, in conjunction with a camera, may automatically select and designate a delivery area and/or a delivery location within a designated delivery area. For example, upon analyzing one or more areas of the premises, management module 220 may designate a garage of the premises as the delivery area. In some case, management module 220 may select a delivery area configured by the occupant to be the default delivery area. Additionally, or alternatively, management module 220 may store information regarding one or more previous deliveries and analyze the stored information to detect one or more patterns associated with a delivery. Based on the one or more detected patterns, management module 220 may select a delivery area and/or delivery location within the delivery area. Upon determining the delivery area, management module 220 may scan the designated delivery area for one or more available locations within the scanned area where a package may be placed by the delivery person. Based on the scan, the management module 220 may designate a delivery location within the delivery area. In some cases, management module 220 may indicate the designated delivery location with one or more audio and/or visual cues. For example, via a speaker, the management module 220 may instruct the delivery person where to place the package. In some cases, management module 220 may configure a light emitting device to visually indicate the designated delivery location.

In one embodiment, analysis module 225, in conjunction with a camera (e.g., sensor 125), may capture a photo and/or video image of the delivery area. Analysis module 225 may perform image analysis on a captured image to identify the designated location. For example, analysis module 225 may detect a marker placed by the occupant at the designated location. Upon determining the designated location, monitoring module 205, in conjunction with a camera, may be configured to monitor the designated delivery location. In one embodiment, analysis module 225 may analyze the captured image to determine whether access to the designated location is obstructed. For example, a box may be placed in the way of and/or over the designated location, a vehicle may pull into the garage in the way of and/or over the designated location, etc. Upon determining access to the designated location is obstructed by another object, notification module 210 may generate a notification comprising information regarding the detected obstruction.

In one embodiment, location module 230 may determine a location and/or heading of an occupant of the premises. For example, location module 230 may determine a distance between the premises and the occupant, a heading of the occupant, and the like. Based on the location and heading of the occupant in relation to previously detected patterns, location module 230 may determine that the occupant is at the premises, heading away from the premises, heading to the premises, etc. Upon determining the location of the occupant is beyond a predefined distance of the premises, management module 220 may automatically select a type of delivery. The type of delivery may specify a delivery location within a delivery area at the premises where the package is to be placed by the delivery person. In some cases, upon determining the location of the occupant is within a predefined distance of the premises, management module 220 may request the occupant select a type of delivery.

In one embodiment, upon verifying the identity of the delivery person, management module 220 may grant the delivery person access to the delivery area. For example, management module 220 may grant the delivery person access to a garage space by actuating a garage door opener or grant access to an entry way of the premises by actuating a door locking mechanism on an exterior door of the premises. Additionally, or alternatively, upon verifying that at least one monitored locking mechanism of the premises is in a locked position, management module 220 may grant the delivery person access to the delivery area. In some cases, upon granting access to the delivery person, management module 220, in conjunction with a camera, may capture one or more photo and/or video images of the delivery person in the delivery area while the delivery person places the package at the designated location. In some cases, management module 220 may send in real-time one or more captured images of the delivery in-progress to the occupant. Thus, the occupant may monitor the delivery in real-time. In some cases, the management module 220 may enable the occupant to communicate with the delivery person in real-time while the delivery person delivers the package.

In some cases, detection module 215 may determine where the delivery person places the package inside the delivery area. Upon determining where the delivery person places the package inside the delivery area, analysis module 225 may determine whether a difference between the designated delivery location and the actual location where the package is delivered satisfies a predetermined threshold. Upon determining the difference between the designated delivery location and the actual location where the package is delivered satisfies a predetermined threshold, management module 220 may prompt the delivery person to adjust the location of the package placement. For example, management module 220 may provide an audio feedback (e.g., play a recorded voice instruction, digitally communicate a text-to-speech instruction, etc.), visual feedback (e.g., a flashing light, a certain color of light). In some cases, management module may provide a continuous visual feedback while the delivery person is delivering the package. For example, upon entering the delivery location, a light emitting device may shine a red light on a surface of the delivery area until the package is placed within a predetermined distance of the designated delivery location. Upon detecting the delivery person placing the package within the predetermined distance of the designated delivery location, the light emitting device may switch from emitting the red light to a green light. Additionally, or alternatively, audio feedback may indicate proper placement of the package at the designated delivery location.

In one embodiment, upon determining the package is delivered securely (e.g., the package is in place, the delivery person has exited the delivery area, the delivery area is secured), notification module 210 may send a delivery notification to the occupant. The delivery notification may include at least one element of information regarding the delivery of the package, one or more photo and/or video images of the delivered package, and/or a system security overview. The system security overview may include graphical symbols and one or more word descriptions regarding the security of the premises (e.g., a green light symbol next to "front door," a green light symbol next to "garage door," a green light symbol next to "back door," etc.).

In one embodiment, upon detecting the occupant approaching the premises subsequent to the delivery of the package, notification module 210 may generate and send a reminder notification. The reminder notification may include at least one element of a reminder that the package is delivered, information regarding the delivery of the package, and one or more photo and/or video images of the delivered package. In some cases, analysis module 225, in conjunction with a camera, may analyze the location of the delivered package in relation to a location of vehicle parking spot inside the garage. For example, secure delivery manager 140-a may detect one or more patterns and learn when and where a vehicle typically parks inside the garage. For example, analysis module 225 may determine the probability of a vehicle detected as approaching the premises of being parked in a certain location within the garage. Based on the learned parking pattern, analysis module 225 may perform a collision risk analysis when detection module 215 detects an approaching vehicle, determining the likelihood of a vehicle entering the garage and colliding with the delivered package. Upon detecting the likelihood of a collision satisfies a predetermined threshold, notification module 210 may generate and send a warning notification indicating a potential collision.

Figure 3:
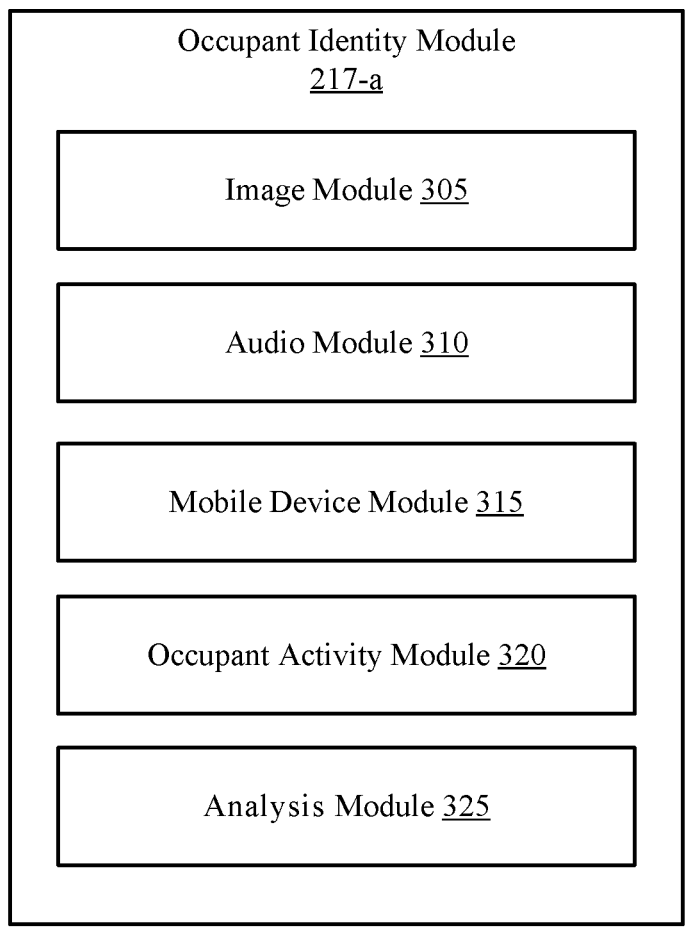

FIG. 3 illustrates a block diagram 300 that support secure package delivery in accordance with aspects of the present disclosure. The occupant identity module 217-a may be one example of occupant identity module 217 depicted in FIG. 2. As depicted, occupant identity module 217-a may include an image module 305, an audio module 310, a mobile device module 315, an occupant activity module 320, and an analysis module 325.

The image module 305 may control a camera that captures images of the areas around and in the structure of the premises to determine the identity of occupants. The image module 305 may use facial recognition to determine the identity of the occupant. In other examples, the image module 305 may associate the location of the detected occupant with hobbies or belongings of the occupant. In this type of example, the identity of the occupant may be based at least in part on the hobbies being performed by the detected occupant or the belongings being used by the detected occupant. In some cases, occupants that are detected in the images residing in certain bedrooms or driving certain automobiles may be identified based on the occupants that are assigned to live in those bedrooms or who own those automobiles.

The audio module 310 may be used to record sounds of the occupant. In some examples, the sounds include conversations of the occupant or other noises made by the occupant. Speech recognition may be employed to detect words spoken by the occupant to assist in identifying the occupant. For example, the occupant may identify himself or herself to another occupant or over the phone. In some cases, one of the occupants of the premises may identify the other occupant by calling the other occupant by his or her name. In yet other examples, the occupant may discuss hobbies, interests, belongings, and other topics that can be traced back to an identity of one of the potential occupants of the premises.

The mobile device module 315 may associate the identity of an occupant with an identification of a mobile device, such as a mac address, a routing address, a serial number, an internet protocol address, or another type of identifier with an identity of an occupant. In some cases, the mobile device module 315 may identify the location of a mobile device on the premises and request information about the mobile device. Based on the identification of the mobile device, the mobile device module 315 may determine that the occupant associated with that mobile device is on the premises. In some cases, the mobile device module 315 may query the onsite mobile device to determine the last time the mobile device was used. In those cases where the mobile device is not used for a significant period of time, the mobile device module 315 may not determine that the mere presence of the mobile device in the structure is reliable enough to conclude that the occupant associated with the mobile device is on-site just because his or her mobile device is on-site. But, in those cases where the mobile device responds back to the mobile device module 315 that the mobile device has been used recently, the mobile device module 315 may conclude that the occupant associated with that mobile device is also located on-site. In some cases, the mobile device may send a log of when certain passwords, fingerprint recognition, retina recognition, voice recognition, or other types of recognition features have been used on the mobile device to assist with determining whether the occupant associated with the mobile device is on-site.

In some cases, the mobile device module 315 may query the mobile device for the user's calendar to determine where the potential occupant is supposed to be when the delivery person arrives. In those examples where the calendar indicates that the occupant is supposed to be at work when the delivery person arrives, the mobile device module 315 may use the calendar's input as a factor with other factors to determine the identity of the occupant.

The occupant activity module 320 may determine, at least in part, the identity of the occupant based on activities performed by the occupant. For example, the occupant activity module 320 may know which activities are performed by which occupants, the activities that are never performed by certain occupants, the frequency that certain activities are performed by certain occupants, the unique way that each occupant performed certain activities, or combinations thereof. For example, the occupant activity module 320 may machine learn the activities performed by each occupant and store those activities in a database that correlates the activities and activity information with specific occupant identities. In those cases where the occupant performed an activity that is associated with a single potential occupant, the occupant activity module 320 may identity the occupant as the single potential occupant associated with that activity. In some cases, the occupant activity module 320 may narrow down the list of potential occupants using the image module 305, the audio module 310, or another module to just two potential occupants. In this circumstance, the occupant activity module 320 may eliminate one of the potential occupants if the occupant is performing an activity that is associated with a potential occupant that never performs that specific activity.

The analysis module 325 may perform an analysis of the various inputs from each of the image module 305, the audio module 310, the mobile device module 315, the occupant activity module 320, another type of module, or combinations thereof to determine the identity of the occupant. In some examples, the analysis module 325 may include weight inputs differently with a confidence score. For example, a facial recognition input that associates an identity of an occupant may have a higher confidence than an input from the occupant activity module that indicates that a potential occupant may occasionally perform the activity that is currently being performed by the occupant. In an example where just these two inputs are received by the analysis module 325, the analysis module 325 may determine that the identity determined by the image module 305 is the correctly identified identity of the occupant when the inputs from the image module 305 are given more weight than the inputs from the occupant activity module. In other examples, the analysis module 325 may receive inputs from different module that reinforce each other. For example, each of the modules may provide input that indicate that the occupant is the same identity. In such an example, the confidence score of each of these inputs may be incremented to reflect the higher confidence.

Figure 4:
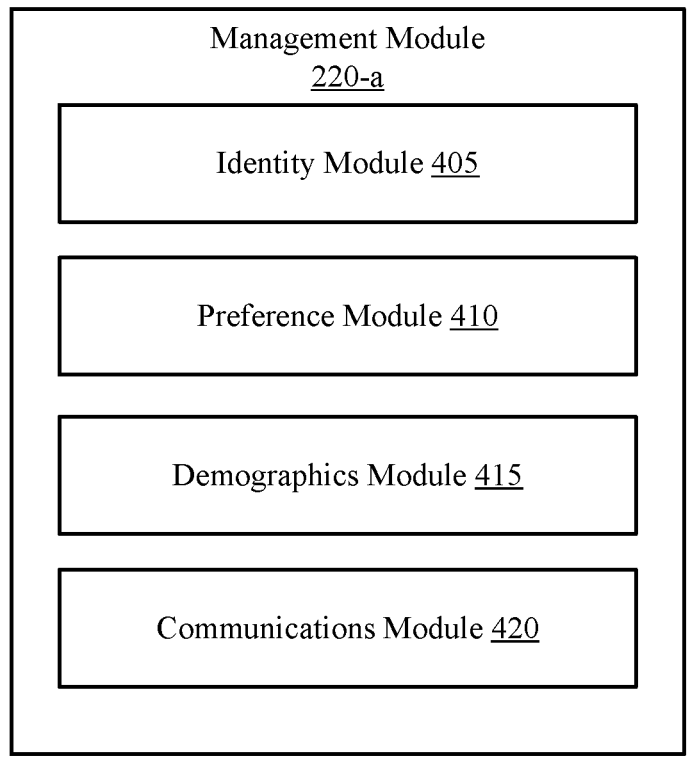

FIG. 4 illustrates a block diagram 400 that support secure package delivery in accordance with aspects of the present disclosure. As depicted, management module 220-*a* may include an identity module 405, a preference module 410, a demographics module 415, and a communication module 420.

The identity module 405 may obtain the identity of the occupant at the time that the delivery person arrives at the premises. The identity of the occupant may be stored in a database that associates delivery instructions with the identity of the occupant. The identity module 405 may obtain the identity of the occupant from the occupant identity module 217 depicted in FIGS. 2 and 3.

The preference module 410 may determine preferences of the identity of the occupant. In some examples, the preference module 410 may send a request to the occupant asking for the occupant's delivery preferences. In some cases, the request may be sent by the preference module 410 around the time that the delivery person is expected to arrive. In this example, the preferences may be used for just that delivery. In other examples, the preference module 410 may send the request at a time when no delivery is pending. In this example, the delivery preferences sent back to the preference module 410 by the occupant may be applied to future deliveries. In some cases, the preferences of the occupant may include leaving the package outside the structure in a designated area, leaving the package on the inside of the structure, unlocking the structure to deliver the package, using a code to enter the structure to deliver the package, leaving the package in a vehicle designated by the occupant, sending a text notifying the occupant when the delivery is expected to arrive, calling the occupant about the delivery, another preference, or combinations thereof.

The demographics module 415 may include demographic information about the occupant. This demographic information may include the occupant's age, gender, race, handicaps, and so forth. The demographic information may be automatically updated as applicable. For example, the demographic information may include the occupant's birthday, and increment the occupant's age every year on his or her birthday. In some examples, the demographic information is collected from the occupant by requesting the information from the occupant or extracting that information from another source. The demographic information can be used by the demographics module 415 to derive delivery preferences for the occupants. For example, the demographics module 415 may derive that the delivery person should not enter the structure at the premises when the only occupants that are home are minors. Further, the demographics module 415 may derive that when the delivery person is a male and the identity of the occupant is a female that the delivery person should call the occupant before entering the structure. In some examples, the preferences that are expressly indicated by the occupant may override the derived preferences. For example, an occupant that is a female may expressly state that her preference is to have the delivery person enter the structure and leave packages in a designated area. But, in other examples, the derived preferences may override preferences expressly recited by the occupant. For example, in those situations where a minor may express a preference to have the delivery person enter the structure, the demographics module 415 may override the expressed preference and send delivery instructions that the packages are to be left at a designated location outside of the structure.

The communication module 420 may communicate the delivery instructions to the delivery person. For example, the communication module 420 may cause a voice message to be sent to the delivery person's phone, cause a written message to be sent to the delivery person's phone, display the delivery instructions in a screen attached to the structure and accessible to the delivery person when the delivery person arrives at the home, send the delivery instructions to the delivery person through another communication mechanism, or combinations thereof.

FIG. 5 illustrates an example of delivery information 145-c that supports secure package delivery in accordance with aspects of the present disclosure. The delivery information 145-c may be one example of delivery information 145 as depicted in FIG. 1. As depicted, delivery information 145-c may include an occupant identity column 500, an age column 505, a gender column 510, a handicap column 515, and a preference column 520. The delivery information 145-c may also include occupant row 525, occupant row 530, occupant row 535, occupant row 540, and occupant row 545. In other examples, another appropriate number of rows and columns may be included in the database.

In one example, the occupant row 525 correlates the identity of an occupant as John Smith, who is 42 years old, is a male, has no indicated handicaps, and does not include a delivery preference. In this example, when the delivery instructions sent to the delivery person when just occupant, John Smith, is home may be instructions to enter the home and leave the package in a designated area. These delivery instructions may be derived by John being a male and a mature enough age to be comfortable being home alone with the delivery person. John Smith may have an option to change his delivery preferences if John Smith decides later than he desires to give the delivery person different instructions.

Occupant row 530 may correlate occupant identity, Mary Smith, as being a female, 39 years old, having no indicated handicaps, and having a preference to leave packages outside of the structure. In this example, the delivery instructions to the delivery person may include instructions to leave all packages outside of the structure at a designated area. In this example, even though Mary Smith is associated with having an age that may be comfortable to be home with just the delivery person, the express preferences from Mary Smith may trump the potentially derived preferences.

Occupant row 535 may correlate occupant identity, Joe Smith, as being male, 16 years old, who has no indicated handicaps, and has no preferences. In this example, the derived preferences may be based, at least in part, on the occupant's age. Thus, the derived preferences may cause the delivery instructions to instruct the delivery person to leave the packages outside of the structure in a designated area.

Occupant row 540 may correlate occupant identity, Alex Smith, as a 13 year old male with a handicap of being blind. While occupant identity Alex Smith may not have express delivery preference, the demographics of Alex Smith being a minor and having an additional vulnerability due to being blind may set the default instructions to have the packages left outside of the structure at a designated area.

Occupant row 545 may correlate occupant identity, Jane Smith, a female that is 6 years old with no handicaps or preferences. In this case, as in the other cases with minors, the default delivery instructions may be to leave packages outside.

In some cases, more than one of the occupants may be present on the premises. In that case, the system have determine that if an appointed occupant identity is on the premises, that the delivery instructions associated with that appointed occupant will control the delivery instructions. For example, the system may determine to follow the delivery instructions of Mary Smith since she has expressly articulated her delivery instruction preferences. In other examples, the demographics of the minors or other types of demographics may control the delivery instructions.

Figure 6:
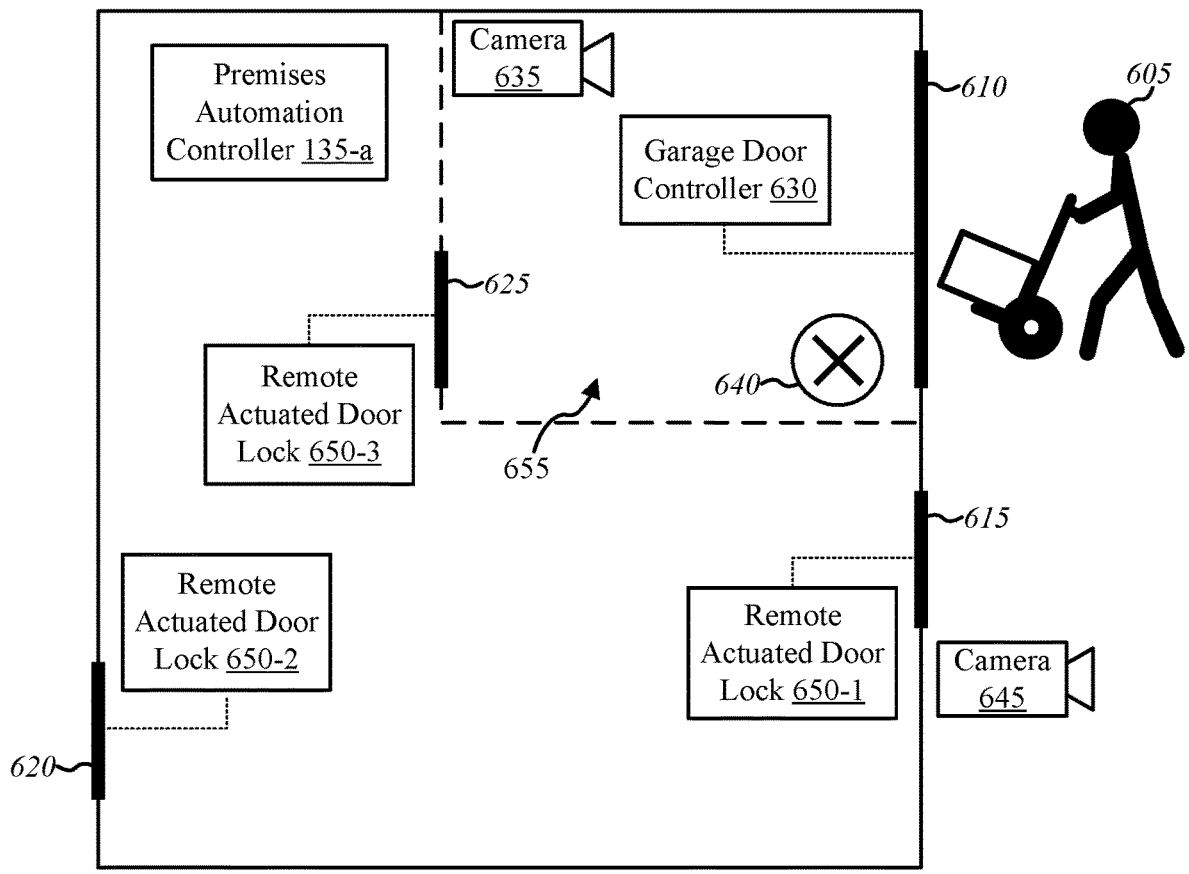
FIG. 6 illustrates an example of a premises that supports secure package delivery in accordance with aspects of the present disclosure.

FIG. 6 illustrates an example of a premises 600 that supports secure package delivery in accordance with aspects of the present disclosure. As depicted, a delivery person 605 may be charged to deliver a package to the premises 600. The premises 600 may include one or more points of entry to control access to certain areas of the premises 600. For example, premises 600 may include a garage door 610, a front door 615, a back door 620, and a door 625 to the garage 655 situated between an interior area of the premises 600 and the garage 655. In some cases, premises 600 may include one or more cameras such as camera 635 situated in relation to an area of the garage 655 and/or camera 645 situated in relation to the front door 615. Premises 600 may include a premises automation controller 135-a, which may be one example of premises automation controller 135 as described with reference to FIG. 1.

In one embodiment, the premises automation controller 135-a, in conjunction with the secure delivery manager 140, may detect an arrival of the delivery person 605 to premises 600. For example, premises automation controller 135-a may analyze an image captured by camera 645 to determine that the delivery person is at the premises 600. In some cases, camera 645 may capture one or more photo and/or video images in order to verify delivery information such an identity of the delivery person 605, a barcode, etc. Upon verifying the delivery person 605, premises automation controller 135-a may grant the delivery person 605 access to a designated delivery area. In one example, premises automation controller 135-a may send a command to a garage door controller 630 to open the garage door 610. In some cases, before granting access to the delivery person 605, premises automation controller 135-a may verify that one or more locking mechanisms associated with one or more entry ways of premises 600 are in a locking position. For example, before granting access to the delivery person, premises automation controller 135-a may verify that remote actuated door lock 650-1 of the front door 615, remote actuated door lock 650-2 of back door 620, and/or remote actuated door lock 650-3 of the door 625 to the garage 655 are in a locked position. In one example, an exterior wall of the garage 655 may include a man door or pass door, a hinged door that provides an additional access point to the garage 655 from outside the premises 600. Thus, in some cases, the delivery person may be granted access to the garage 655 by unlocking a man door or pass door on garage 655.

In some cases, premises automation controller 135-a may grant access to the delivery person 605 by verifying a temporary access code delivered to a device of the delivery person 605. For example, premises automation controller 135-a may send a temporary access code to a smart phone of the delivery person. Upon arriving, premises automation controller 135-a may detect a device of the delivery person transmitting the temporary access code, and upon verifying the temporary access code, grant the delivery person 605 access to the designated delivery area. In the depicted example, premises automation controller 135-a may grant the delivery person 605 access to the garage 655 via garage door 610. Upon entering the garage, the delivery person may be enabled to determine where to place the package by observing an indicator 640 of the designated delivery location. In some cases, the designated delivery location may be marked by one or more signs affixed to a surface of the garage 655 (e.g., a wall and/or floor of the garage 655). In some cases, the designated delivery location may be indicated by one or more light emitting devices.

Accordingly, the delivery person 605 may exit the delivery area (e.g., garage 655) after placing the package at the delivery location designated by the indicator 640. After detecting the delivery person 605 placing the delivery at the designated delivery location and the delivery person 605 exiting the garage 655, premises automation controller 135-*a* may send a command to the garage door controller 630 to close the garage door 610. In some cases, premises automation controller 135-*a* may then send a delivery notification to an occupant of premises 600, whether the occupant is at the premises or away. Although the depicted example is described using premises automation controller 135-*a*, in some cases one or more described functions may be integrated within the garage door controller 630, camera 635, camera 645, and/or remote actuated door locks 650-1, 650-2, and 650-3, any one or combination of which may perform one or more of the above-described functions with or without the premises automation controller 135-*a*.

In one embodiment, detection module 215, via one or more sensors, may detect a temperature of the delivery area. Additionally, or alternatively, detection module 215 may detect a temperature in association with the one or more items being delivered. For instance, detection module 215 may detect a temperature of a garage area, the temperature of a refrigeration unit (e.g., an ice box, a cooler, a freezer, a fridge, etc.), and/or the temperature of the delivered item. Thus, if an item being delivered were to include perishable items such as food, the notification module 210 may be configured to instruct the delivery person to place the item in a refrigeration unit located at the premises. In some cases, management module 220 may associate a timestamp on the one or more items being delivered, enabling the notification module 210 to notify an occupant of the premises how long a delivered item has been located on the designated delivery location. In some cases, detection module 215 may detect adverse conditions for a delivered item in association with the location where the item was delivered. For example, if conditions of the delivery location change and/or the delivery person does not delivery the item to the proper location (e.g., a refrigeration unit), then notification module 210 may send an alert. For instance, notification module 210 may send an alert if an item remains exposed in a detected adverse condition beyond a predetermined time period. One or more photo and/or video images may be analyzed by analysis module 225 to indicate when a delivered item is removed from the designated delivery location such as being brought inside a premises.

Figure 7:
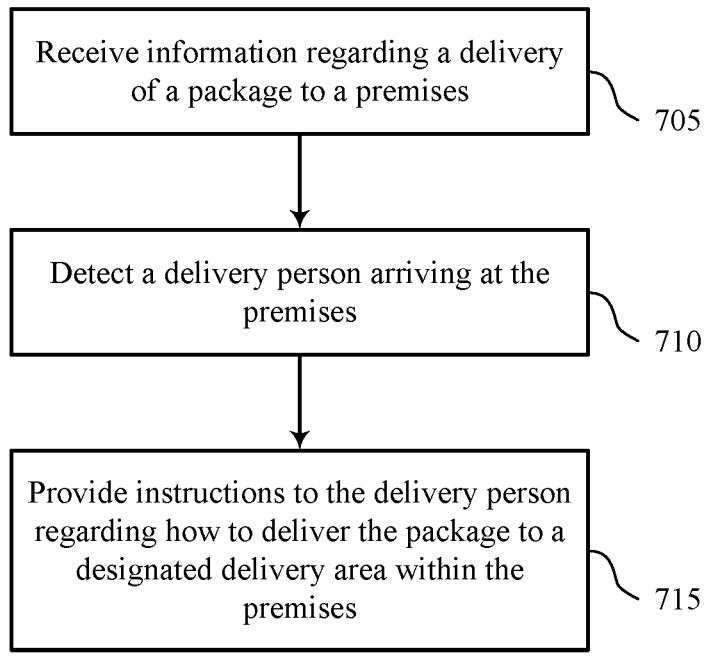
FIGS. 7 through 10 illustrate methods for secure package delivery in accordance with aspects of the present disclosure.

FIG. 7 shows a flowchart illustrating a method 700 for secure package delivery in accordance with aspects of the present disclosure. The operations of method 700 may be implemented by a device 105 or its components as described herein. For example, the operations of method 700 may be performed by a secure delivery manager as described with reference to FIGS. 1 through 4. In some examples, a device 105 may execute a set of codes to control the functional elements of the device to perform the functions described below. Additionally, or alternatively, the device 105 may perform aspects of the functions described below using special-purpose hardware.

At 705, the device 105 may receive information regarding a delivery of a package to a premises. The operations of 705 may be performed according to the methods described herein. In certain examples, aspects of the operations of 705 may be performed by one or more components of the secure delivery manager as described with reference to FIGS. 1 through 4.

At 710, the device 105 may detect a delivery person arriving at the premises. The operations of 710 may be performed according to the methods described herein. In certain examples, aspects of the operations of 710 may be performed by one or more components of the secure delivery manager as described with reference to FIGS. 1 through 4.

At 715, the device 105 may provide instructions to the delivery person regarding how to deliver the package to a designated delivery area within the premises. The operations of 715 may be performed according to the methods described herein. In certain examples, aspects of the operations of 715 may be performed by one or more components of the secure delivery manager as described with reference to FIGS. 1 through 4.

Figure 8:
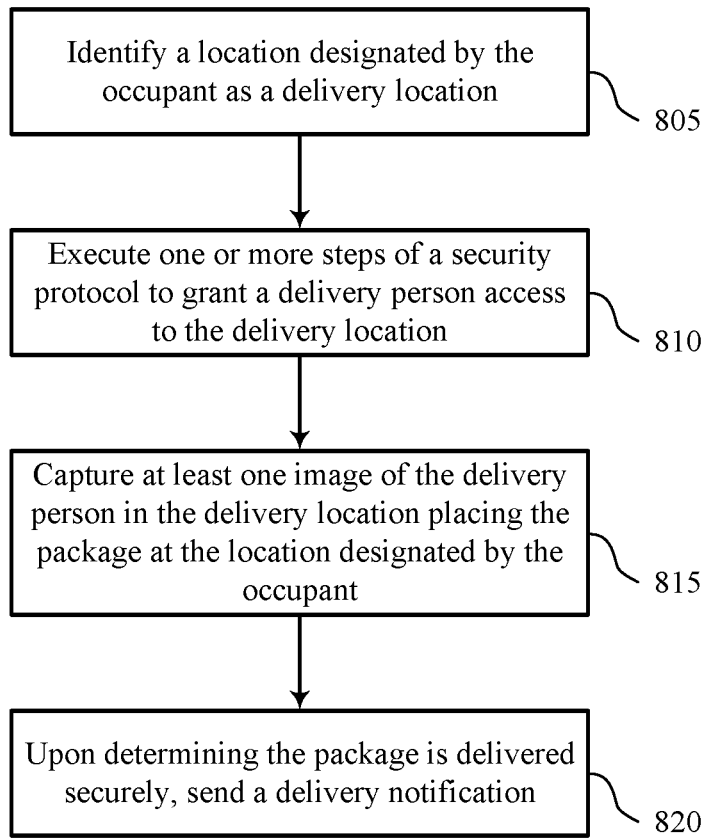

FIG. 8 shows a flowchart illustrating a method 800 for secure package delivery in accordance with aspects of the present disclosure. The operations of method 800 may be implemented by a device 105 or its components as described herein. For example, the operations of method 800 may be performed by a secure delivery manager as described with reference to FIGS. 1 through 4. In some examples, a device 105 may execute a set of codes to control the functional elements of the device to perform the functions described below. Additionally, or alternatively, the device 105 may perform aspects of the functions described below using special-purpose hardware.

At 805, the device 105 may identify a location designated by the occupant as a delivery location. The operations of 805 may be performed according to the methods described herein. In certain examples, aspects of the operations of 805 may be performed by one or more components of the secure delivery manager as described with reference to FIGS. 1 through 4.

At 810, the device 105 may execute one or more steps of a security protocol to grant a delivery person access to the delivery location. The operations of 810 may be performed according to the methods described herein. In certain examples, aspects of the operations of 810 may be performed by one or more components of the secure delivery manager as described with reference to FIGS. 1 through 4.

At 815, the device 105 may capture at least one image of the delivery person in the delivery location placing the package at the location designated by the occupant. The operations of 815 may be performed according to the methods described herein. In certain examples, aspects of the operations of 815 may be performed by one or more components of the secure delivery manager as described with reference to FIGS. 1 through 4.

At 820, the device 105 may upon determining the package is delivered securely, send a delivery notification. The operations of 820 may be performed according to the methods described herein. In certain examples, aspects of the operations of 820 may be performed by one or more components of the secure delivery manager as described with reference to FIGS. 1 through 4.

Figure 9:
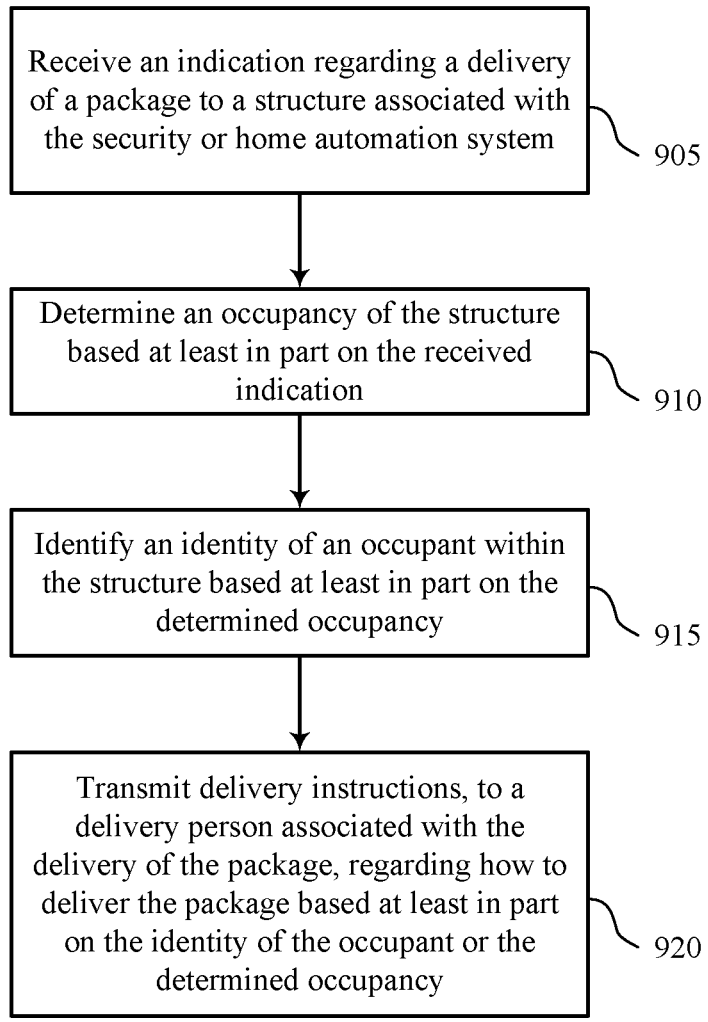

FIG. 9 shows a flowchart illustrating a method 900 for secure package delivery in accordance with aspects of the present disclosure. The operations of method 900 may be implemented by a device 105 or its components as described herein. For example, the operations of method 900 may be performed by a secure delivery manager as described with reference to FIGS. 1 through 4. In some examples, a device 105 may execute a set of codes to control the functional elements of the device to perform the functions described below. Additionally, or alternatively, the device 105 may perform aspects of the functions described below using special-purpose hardware.

At 905, the device 105 may receive an indication regarding a delivery of a package to a structure associated with a security or home automation system. In some examples, the indication may be a message from a delivery person about when the delivery person expects to deliver a package. An entity employing the delivery person may send the indication through an electronic message or another type of signal. In yet other examples, the indication may be received at the time that the delivery person arrives at the structure. The operations of 905 may be performed according to the methods described herein. In certain examples, aspects of the operations of 905 may be performed by one or more components of the secure delivery manager as described with reference to FIGS. 1 through 4.

At 910, the device 105 may determine an occupancy of the structure based at least in part on the received indication. In some examples, the device 105 may determine whether the structure is occupied in response to receiving the indication about the delivery. Cameras, microphones, other types of sensors, or combinations thereof may be used to determine whether the structure is occupied when the delivery person arrives or when the delivery person is expected to arrive. The operations of 910 may be performed according to the methods described herein. In certain examples, aspects of the operations of 910 may be performed by one or more components of the secure delivery manager as described with reference to FIGS. 1 through 4.

At 915, the device 105 may identify an identity of an occupant within the structure based at least in part on the determined occupancy. In some cases, the identity of the occupant may be determined through facial recognition, audio recordings, activities performed by the occupant, the location of the occupant's mobile device, the calendar associated with the occupant's mobile device, another factor, or combinations thereof. The operations of 915 may be performed according to the methods described herein. In certain examples, aspects of the operations of 915 may be performed by one or more components of the secure delivery manager as described with reference to FIGS. 1 through 4.

At 920, the device 105 may transmit delivery instructions, to a delivery person associated with the delivery of the package, regarding how to deliver the package based at least in part on the identity of the occupant or the determined occupancy. In some cases, if the identity of the occupant is associated with a delivery preference, the delivery instructions may include the delivery preference associated with that identity. In another example, the demographics of the identity may cause a default set of delivery instructions to be delivered, such as if the occupant is a minor or has a certain type of vulnerability. In some cases, if there is no occupant, the transmitted message may include different instructions that would otherwise be the case if an occupant was in the structure. The operations of 920 may be performed according to the methods described herein. In certain examples, aspects of the operations of 920 may be performed by one or more components of the secure delivery manager as described with reference to FIGS. 1 through 4.

Figure 10:
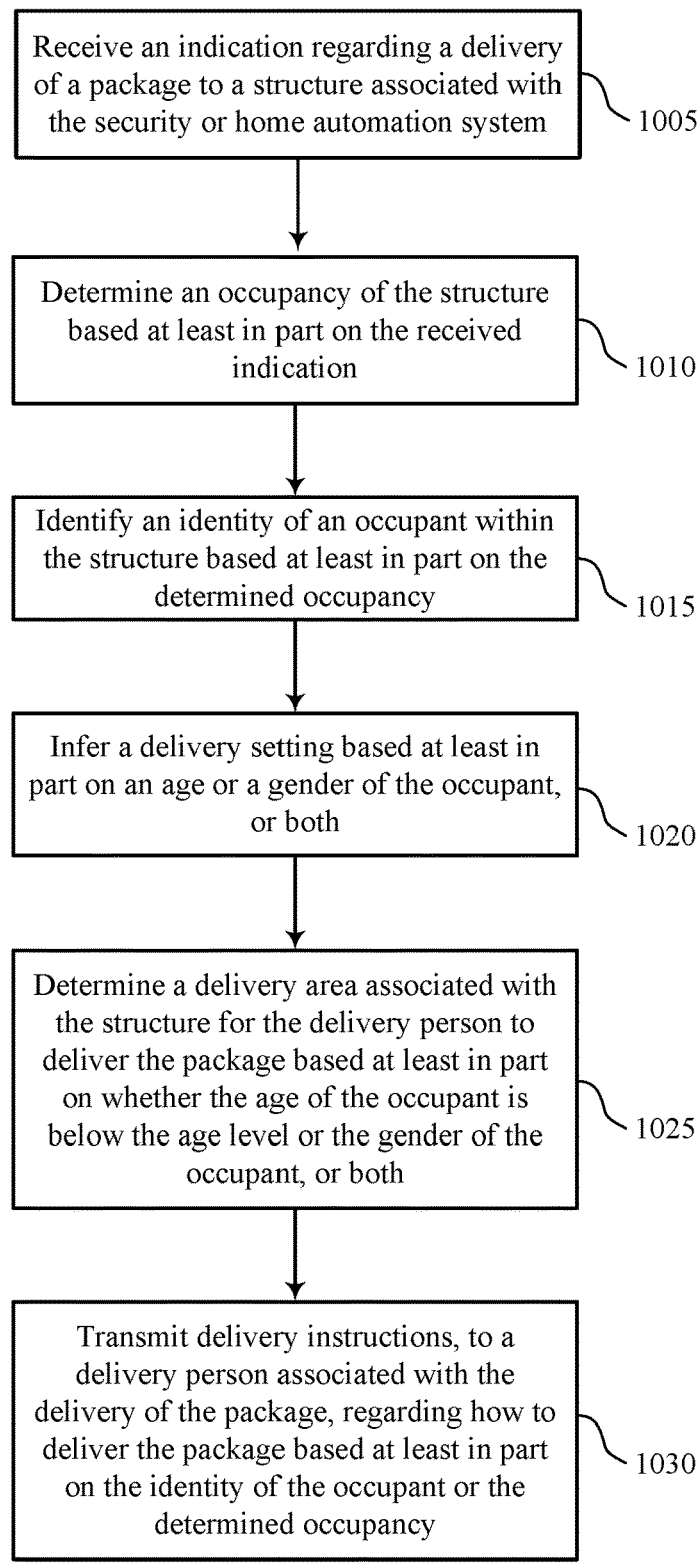

FIG. 10 shows a flowchart illustrating a method 1000 for secure package delivery in accordance with aspects of the present disclosure. The operations of method 1000 may be implemented by a device 105 or its components as described herein. For example, the operations of method 1000 may be performed by a secure delivery manager as described with reference to FIGS. 1 through 4. In some examples, a device 105 may execute a set of codes to control the functional elements of the device to perform the functions described below. Additionally, or alternatively, the device 105 may perform aspects of the functions described below using special-purpose hardware.

At 1005, the device 105 may receive an indication regarding delivery of a package to a structure associated with the security or home automation system. The operations of 1005 may be performed according to the methods described herein. In certain examples, aspects of the operations of 1005 may be performed by one or more components of the secure delivery manager as described with reference to FIGS. 1 through 4.

At 1010, the device 105 may determine an occupancy of the structure based at least in part on the received indication. The operations of 1010 may be performed according to the methods described herein. In certain examples, aspects of the operations of 1010 may be performed by one or more components of the secure delivery manager as described with reference to FIGS. 1 through 4.

At block 1015, the device 105 may identify an identity of an occupant within the structure based at least in part on the determined occupancy. The operations of 1015 may be performed according to the methods described herein. In certain examples, aspects of the operations of 1015 may be performed by one or more components of the secure delivery manager as described with reference to FIGS. 1 through 4.

At 1020, the device 105 may infer a delivery setting based at least in part on an age or a gender of the occupant, or both. In some cases, a database may include delivery settings that are associated with an identity based at least in part on the age or gender of the identified occupant. For example, if the occupant is a minor, the system may infer that the delivery instructions are to instruct the delivery person to leave the package outside of the structure rather than a designated area within the structure. In some cases, when the occupant is female, the system may infer that she would prefer to have the package left outside of the structure in a designated area. In other examples, the occupant may have the option of inputting a request into the system about his or her preferences for delivery that may override the inferences made by the system in some case. The operations of 1020 may be performed according to the methods described herein. In certain examples, aspects of the operations of 1020 may be performed by one or more components of the secure delivery manager as described with reference to FIGS. 1 through 4.

At 1025, the device 105 may determine a delivery area associated with the structure for the delivery person to deliver the package based at least in part on whether the age of the occupant is below the age level or the gender of the occupant, or both. In some examples, the age level of the occupant may be the age of majority based on the laws of the jurisdiction in which the package is being delivered. For example, if the age of majority is 18, the designated delivery area may be an outside designed area for those occupants are under 18 and inside for those occupants that are 18 or older. Likewise, the delivery area may be, by default, inside the structure for males and outside for females. The operations of 1025 may be performed according to the methods described herein. In certain examples, aspects of the operations of 1025 may be performed by one or more components of the secure delivery manager as described with reference to FIGS. 1 through 4.

At 1030, the device 105 may transmit delivery instructions, to a delivery person associated with the delivery of the package, regarding how to deliver the package based at least in part on the identity of the occupant or the determined occupancy. In some cases, the delivery instructions regard how to deliver the package based at least in part on the identity of the occupant or that determined occupancy. In some cases, if the identity of the occupant is associated with a delivery preference, the delivery instructions may include the delivery preference associated with that identity. In another example, the demographics of the identity may causes a default set of delivery instructions to be delivered, such as if the occupant is a minor or has a certain type of vulnerability. In some cases, if there is no occupant, the transmitted message may include different instructions that would otherwise be the case if an occupant was in the structure. The operations of 1030 may be performed according to the methods described herein. In certain examples, aspects of the operations of 1030 may be performed by one or more components of the secure delivery manager as described with reference to FIGS. 1 through 4.

Figure 11:
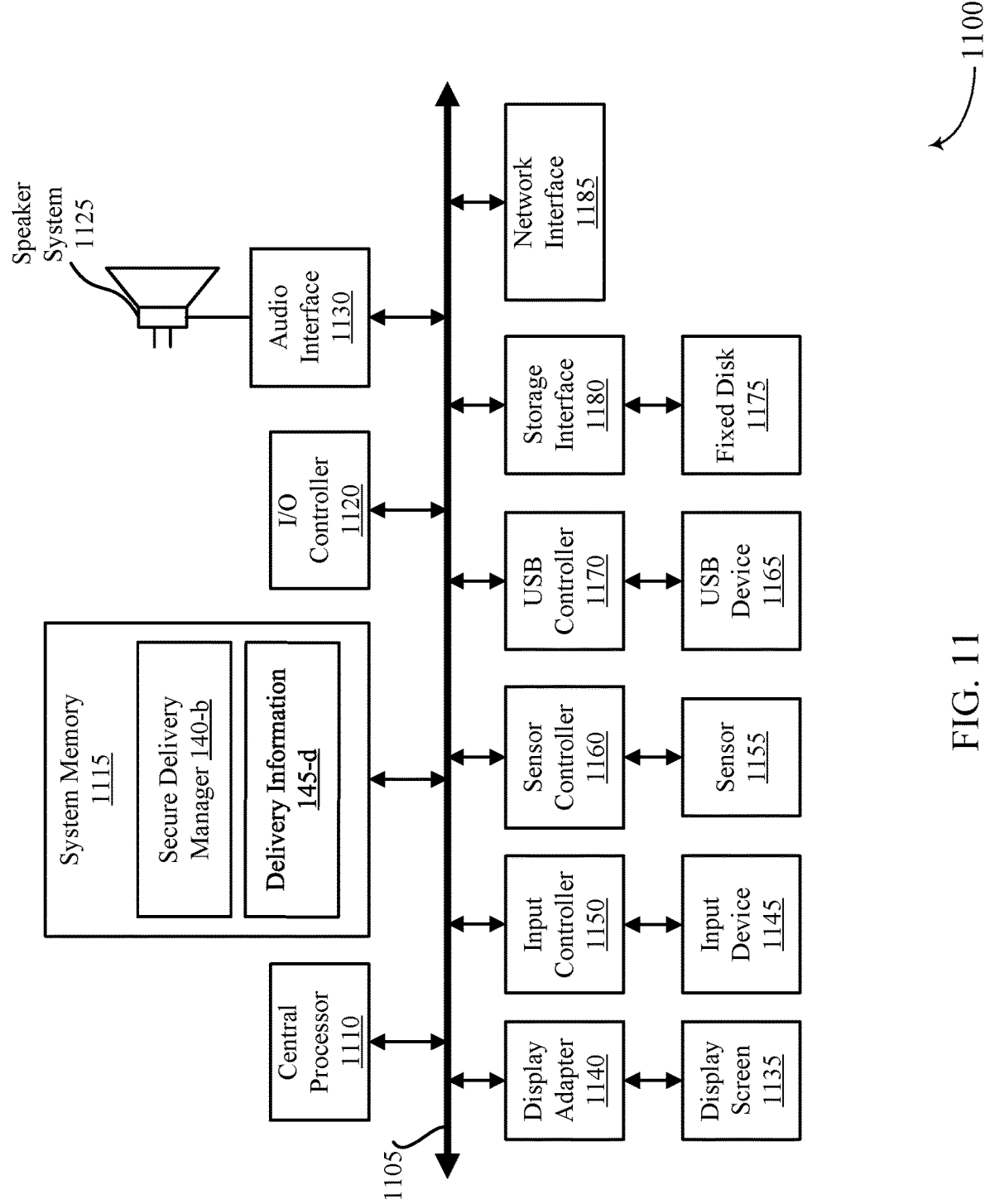
FIG. 11 illustrates a block diagram of a computer system for secure package delivery in accordance with aspects of the present disclosure.

FIG. 11 illustrates a block diagram of a computer system 1100 for secure package delivery in accordance with aspects of the present disclosure. The computer system 1100 may include a device that may be an example of device 105, and/or server 110 illustrated in FIG. 1. In one configuration, computer system 1100 includes a bus 1105 which interconnects major subsystems of the computer system 1100, such as a central processor 1110, a system memory 1115 (typically random access memory (RAM), but which may also include read-only memory (ROM), flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), and a storage interface 1180. Also included are at least one sensor 1155 connected to bus 1105 through a sensor controller 1160 and a network interface 1185 (coupled directly to bus 1105).

Bus 1105 allows data communication between central processor 1110 and system memory 1115, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the secure delivery manager 140-b to implement the present systems and methods may be stored within the system memory 1115. In some examples, the delivery information 145-d may be stored within the system memory 1115. Applications resident with the computer system 1100 generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via the network interface 1185.

Storage interface 1180, as with the other storage interfaces of the computer system 1100, can connect to a standard computer readable medium for storage and/or retrieval of information, such as a fixed disk drive 1175. Fixed disk drive 1175 may be a part of the computer system 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to the computer system 1100 wirelessly via network interface 1185.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on the computer system 1100 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with the computer system 1100 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 1185 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 1120 may operate in conjunction with network interface 1185 and/or storage interface 1180. The network interface 1185 may enable the computer system 1100 with the ability to communicate with client devices (e.g., device 105 of FIG. 1), and/or other devices over the network 115 of FIG. 1. Network interface 1185 may provide wired and/or wireless network connections. In some cases, network interface 1185 may include an Ethernet adapter or Fibre Channel adapter. Storage interface 1180 may enable the computer system 1100 to access one or more data storage devices. The one or more data storage devices may include two or more data tiers each. The storage interface 1180 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for a security or home automation system, comprising:

receiving an indication regarding a delivery of a package to a structure associated with the security or home automation system;

determining an occupancy of the structure based at least in part on the received indication;

identifying, through a sensor of the security or home automation system or through a location service, an identity of an occupant within the structure based at least in part on the determined occupancy;

detecting, via one or more sensors, a pattern of one or more prior deliveries, the pattern comprising motion of a prior delivery person, motion of a prior delivery vehicle, a location of a previously delivered package, or any combination thereof;

identifying a delivery setting corresponding to the occupant based at least in part on at least one of the pattern and a preference of the occupant inferred by one or more characteristics of the occupant, the delivery setting comprising a delivery area associated with the structure;

transmitting delivery instructions, to a delivery person associated with the delivery of the package, regarding how to deliver the package based at least in part on the identity of the occupant and on the delivery setting, the delivery instructions comprising an indication of the delivery area; and wirelessly actuating unlocking of the delivery area within the premises and verifying that a remaining area associated with the structure is locked.

2. The method of claim 1, further comprising:
generating a message, requesting the occupant to select the delivery area, based at least in part on the identity.

3. The method of claim 2, wherein the delivery area comprises a location external to the structure or a location internal to the structure.

4. The method of claim 1, wherein identifying the delivery setting further comprises:
correlating the identity of the occupant to a set of delivery settings stored in a database.

5. The method of claim 1, further comprising:
inferring the delivery setting based at least in part on an age or a gender of the occupant, or both.

6. The method of claim 5, wherein inferring the delivery setting further comprises:
comparing the age of the occupant to an age level;
determining whether the age of the occupant is below the age level;
identifying the gender of the occupant; and
determining a delivery area associated with the structure for the delivery person to deliver the package based at least in part on whether the age of the occupant is below the age level or the gender of the occupant, or both.

7. The method of claim 6, further comprising:
selecting a location external to the structure as the delivery area based at least in part on the age of the occupant being below the age level or the gender of the occupant, or both, wherein the delivery instructions comprise an indication of the selected location as the delivery area.

8. The method of claim 6, further comprising:
selecting a location internal to the structure as the delivery area based at least in part on the age of the occupant being below the age level or the gender of the occupant, or both, wherein the delivery instructions comprise an indication of the selected location as the delivery area.

9. The method of claim 1, wherein identifying the identity of the occupant further comprises:
capturing an image of the occupant; and
performing image analysis on the captured image to identify the identity of the occupant.

10. The method of claim 1, further comprising:
determining a delivery area associated with the structure for the delivery person to deliver the package based at least in part on the inferred preference of the occupant.

11. The method of claim 1,
wherein the delivery setting comprises a method of notifying the occupant of the delivery.

12. An apparatus for a security or home automation system, comprising:
a processor;
memory in electronic communication with the processor; and
instructions stored in the memory and executable by the processor to cause the apparatus to:
receive an indication regarding a delivery of a package to a structure associated with the security or home automation system;
determine an occupancy of the structure based at least in part on the received indication;
identify, through a sensor of the security or home automation system or through a location service, an identity of an occupant within the structure based at least in part on the determined occupancy;
detect, via one or more sensors, a pattern of one or more prior deliveries, the pattern comprising motion of a prior delivery person, motion of a prior delivery vehicle, a location of a previously delivered package, or any combination thereof;
identify a delivery setting corresponding to the occupant based at least in part on at least one of the pattern and a preference of the occupant inferred by one or more characteristics of the occupant, the delivery setting comprising a delivery area associated with the structure;
transmit delivery instructions, to a delivery person associated with the delivery of the package, regarding how to deliver the package based at least in part on the identity of the occupant and on the delivery setting, the delivery instructions comprising an indication of the delivery area; and
wirelessly actuating unlocking of the delivery area within the premises and verifying that a remaining area associated with the structure is locked.

13. The apparatus of claim 12, wherein the instructions are further executable by the processor to cause the apparatus to:
generate a message, requesting the occupant to select the delivery area, based at least in part on the identity.

14. The apparatus of claim 13, wherein the delivery area comprises a location external to the structure or a location internal to the structure.

15. The apparatus of claim 12, wherein the instructions for identifying the delivery setting are further executable by the processor to cause the apparatus to:
correlate the identity of the occupant to a set of delivery settings stored in a database.

16. The apparatus of claim 12, wherein the instructions are further executable by the processor to cause the apparatus to:
infer the delivery setting based at least in part on an age or a gender of the occupant, or both.

17. The apparatus of claim 16, wherein the instructions for inferring the delivery setting are further executable by the processor to cause the apparatus to:
compare the age of the occupant to an age level;
determine whether the age of the occupant is below the age level;
identify the gender of the occupant; and
determine a delivery area associated with the structure for the delivery person to deliver the package based at least in part on whether the age of the occupant is below the age level or the gender of the occupant, or both.

18. The apparatus of claim 17, wherein the instructions are further executable by the processor to cause the apparatus to:
select a location external to the structure as the delivery area based at least in part on the age of the occupant being below the age level or the gender of the occupant, or both, wherein the delivery instructions comprise an indication of the selected location as the delivery area.

19. The apparatus of claim 17, wherein the instructions are further executable by the processor to cause the apparatus to:

select a location internal to the structure as the delivery area based at least in part on the age of the occupant being below the age level or the gender of the occupant, or both, wherein the delivery instructions comprise an indication of the selected location as the delivery area.

20. A non-transitory computer-readable medium storing code for a security or home automation system, the code comprising instructions executable by a processor to:

receive an indication regarding a delivery of a package to a structure associated with the security or home automation system;

determine an occupancy of the structure based at least in part on the received indication;

identify, through a sensor of the security or home automation system or through a location service, an identity of an occupant within the structure based at least in part on the determined occupancy;

detect, via one or more sensors, a pattern of one or more prior deliveries, the pattern comprising motion of a prior delivery person, motion of a prior delivery vehicle, a location of a previously delivered package, or any combination thereof;

identify a delivery setting corresponding to the occupant based at least in part on at least one of the pattern and a preference of the occupant inferred by one or more characteristics of the occupant, the delivery setting comprising a delivery area associated with the structure;

transmit delivery instructions, to a delivery person associated with the delivery of the package, regarding how to deliver the package based at least in part on the identity of the occupant and on the delivery setting, the delivery instructions comprising an indication of the delivery area; and wirelessly actuate unlocking of the delivery area within the premises and verify that a remaining area associated with the structure is locked.

* * * * *